United States Patent
Radford-Hancock

(10) Patent No.: US 6,576,337 B1
(45) Date of Patent: Jun. 10, 2003

(54) RUBBER ARTICLES ADAPTED TO MAKE WELDABLE SEALS; THEIR MANUFACTURE AND USE

(75) Inventor: Colin Nigel Radford-Hancock, South Gloucestershire (GB)

(73) Assignee: Precision Dippings Marketing Limited (GB)

( * ) Notice: Subject to any disclaimer, the term of this patent is extended or adjusted under 35 U.S.C. 154(b) by 0 days.

(21) Appl. No.: 09/627,027

(22) Filed: Jul. 27, 2000

(30) Foreign Application Priority Data

Jul. 28, 1999 (GB) .............................................. 9917584
Nov. 10, 1999 (GB) .............................................. 9926660

(51) Int. Cl.⁷ ................................................ B32B 5/16
(52) U.S. Cl. ....................... 428/332; 428/447; 428/492; 428/493; 428/494; 428/495; 428/516; 428/517; 428/518; 428/520; 427/302; 427/316; 427/412.3; 427/412.4
(58) Field of Search ................................ 428/492, 494, 428/493, 495, 332, 447, 516, 517, 518, 520; 427/412.3, 302, 316, 412.4

(56) References Cited

U.S. PATENT DOCUMENTS

| | | |
|---|---|---|
| 3,382,138 A | 5/1968 | Barth ....................... 428/423.9 |
| 3,411,982 A | 11/1968 | Kavalier et al. ............ 428/493 |
| 5,069,965 A * | 12/1991 | Esemplare |

FOREIGN PATENT DOCUMENTS

| | | |
|---|---|---|
| DE | 3316301 A 1 | 11/1984 |
| EP | 0 122 350 | 10/1984 |
| EP | 0 574 160 A1 | 12/1993 |
| EP | 594 410 | 4/1994 |
| GB | 1067082 | 8/1964 |
| GB | 2 130 137 | 5/1984 |
| GB | 2 360 974 A | 10/2001 |
| WO | 96/25278 | 8/1996 |
| WO | WO/96/25278 * | 8/1996 |
| WO | 00/35978 | 6/2000 |

* cited by examiner

Primary Examiner—Leszek Kiliman
(74) Attorney, Agent, or Firm—Hudak, Shunk & Farine Co. LPA

(57) ABSTRACT

A flexible rubber article such as a neck or cuff seal (1) for a drysuit is made of natural rubber in a conventional way, by dipping a former into a sensitized rubber latex. The application describes applying a thin thermoplastics layer e.g. about 25 μm thick on the surface of the natural rubber so that it can conveniently be welded to another thermoplastics component such as a hot-melt tape. The thermoplastics layer (4,5) may cover the whole or only a marginal part of the rubber article. It may be formed by dipping into a thermoplastics latex. The thermoplastics layer may cover the whole or only a margin of the rubber article. Polyurethane is one suitable material. By providing a non-tacky weldable region the invention is more convenient to use than previous proposals using adhesives.

24 Claims, 2 Drawing Sheets

RUBBER ARTICLES ADAPTED TO MAKE WELDABLE SEALS; THEIR MANUFACTURE AND USE

FIELD OF THE INVENTION

This invention relates to rubber articles suitable for forming weldable joints or seals to other articles. Other aspects relate to the methods of making such articles, methods in which they are jointed to other articles and the resulting composite products. The invention is particularly but not exclusively concerned with rubber components used in waterproof garments such as drysuits, which are used in diving and other watersports

BACKGROUND OF THE INVENTION

Prior Art

By way of background, drysuits are conventionally made up from panels of strong woven fabric which has been rendered impermeable by treatment with nylon, neoprene, polyurethane or other suitable elastomer. The shaped impermeable fabric panels are joined edge-to-edge by stitching to make up the drysuit. The stitched seams are then sealed by laying hot-melt tape along them and applying heat to melt the tape. Hot-melt tapes are well-known commodities. The impermeable fabric of the suit stretches only slightly and is therefore incapable of forming seals around the wearer's ankles, hands and neck or waist. So, soft rubber 'seals' are provided on the suit at these positions. The conventional seal takes the form of a tubular cuff or collar of natural rubber, with a narrower opening to fit sealingly around the body (neck, arm or leg) and a wider opening at the opposite end around which it is joined sealingly to the edge of the suit's body, sleeve or leg opening. This joint must be sealed and strong. Conventionally it is made using a solvent-based adhesive. The rubber cuff as manufactured has poor adhesion, so its margin is roughened by abrasion before applying the adhesive. There are substantial practical difficulties in aligning the adhesive-bearing cuff and suit margins before they are pressed together, because they cannot be allowed to touch until they are properly positioned.

It would be desirable to have a more convenient way of joining such rubber articles.

SUMMARY OF THE INVENTION

Broadly, we propose to provide a rubber article with an adhered coating comprising thermoplastic polymer, such as polyurethane, whereby it is weldable. The rubber article having the coating can then be conveniently non-adhesive when cold. This facilitates aligning it relative to another article to which it is to be joined without the inconvenience of premature sticking. The join may be to another thermoplastic surface, e.g. another rubber article similarly coated, a thermoplastics substrate, or to a hot-melt tape used for joining and/or sealing.

Preferably, the thermoplastic-containing coat is on a flexible rubber layer which either constitutes or is part of the rubber article. The invention has particular application to dipped rubber articles, characterized by flexible layer or membrane structure. Natural rubber is preferred. Usually the dipped rubber layer is up to (i.e. not more than) 1.5 mm thick.

In one particular context of a seal (cuff or collar) for joining around an opening of a garment, a thermoplastic coating is provided around at least a margin of the rubber seal and is overlapped with the margin of the garment fabric. For extra strength this join may be stitched. Thermoplastic polymeric tape can then be positioned along the joint to overlap the coated margin of the rubber article and the bordering region of the suit, and welded to both by the use of heat, e.g. by pre-heating the tape, or by RF treatment: these are well-established techniques. Where the joint has been stitched, the tape should be positioned to overlie the stitching.

In one embodiment a rubber article is coated only at a marginal region, where it is to be joined or sealed to another article. In an alternative embodiment a rubber article may be covered substantially or entirely with the thermoplastic coating. In the context of seals, for example, we have found that such a coating offers advantages independently of ease in joining and sealing. A seal fully coated with an adherent polyurethane or other coating can have a much longer lifetime than an uncovered rubber seal. The coating material can easily be pigmented to block light transmission, which is a primary cause of rubber deterioration. It also becomes easy to provide coloured rubber articles since pigmenting of the applied thermoplastic coating is easy, and enables a wider range of colours to be exploited than when colouring the rubber compound itself.

The thermoplastic coating polymer can be selected according to the material to which the rubber article is to be adhered, and the desired welding conditions. Polyurethanes have been found particularly suitable. Ethylene and vinyl polymers and copolymers may be used. For example a self-crosslinking ethylene-vinylchloride copolymer has been found effective, and can be applied by dipping into a latex thereof. We have used the latex FP882 (Formulated Polymer Products Ltd) with satisfactory results. More than one polymer coat may be applied if wished, and they need not be of the same polymer material. Other suitable materials for the thermoplastic layer include acrylic polymers and acrylic copolymers e.g. with vinyl comonomers, such as styrene acrylic esters. Suitable styrene acrylic ester emulsions are available as REVACRYL from Harco (Harlow Chemical Co).

The coating polymer may be entirely thermoplastic, but it is also possible to use blends. One particular option herein is to blend a thermoplastics resin with a rubber, in particular a rubber (e.g. natural rubber) the same as or similar to that of the basis article, since such a thermoplastic/rubber blend usually has better adhesion to rubber than a thermoplastics-only layer. The proportion of thermoplastics to rubber needs to be sufficient to provide weldability, if that is the envisaged end use. While this cain be determined for given polymer combinations by routine trials, as a general guide a thermoplastics/rubber polymer blend for the coating will usually contain at least 20 wt % thermoplastics (as a percentage of total polymer solids) As mentioned, it can be difficult to adhere to rubber, particularly the natural rubber from which articles such as the above-mentioned seals are often made. A rubber surface has a natural tack, but this is usually eliminated for better handling and use of the material. Conventional measures for reducing tack include applying talc or silicone to the surface, or halogenating the surface in a bath containing chlorine or bromine.

We have found certain methods particularly suited to achieving a strong, direct bond of a thermoplastics layer to the underlying rubber.

Firstly, we have discovered that chemically activating the rubber surface can be used to enable an applied thermoplastic-containing polymer coating to adhere well to rubber. In particular we have found that a halogenation treatment, such as has previously been used only for the purpose of eliminating tack, makes the rubber surface susceptible to direct adhesion of a weldable plastics coating such as a polyurethane coating.

One embodiment of the present proposal is therefore a process in which a rubber article is subjected to a halogenation of its surface followed by coating that surface with a thermoplastic, weldable polymer. The polymer is preferably a polyurethane.

The halogenation treatment may be in an aqueous halogen (chlorine or bromine)-containing bath. Such treatments are known as such, although we believe that their use to promote adhesion of a thermoplastic coating to rubber is new. The halogenation is believed to reduce or eliminate unsaturations at the rubber surface. Coating with the thermoplastic polymer is preferably by dipping, e.g. into an emulsion of the polymer.

Two other preferred process embodiments particularly exploit dipping, using latices of the rubber and of the thermoplastic resin used to form the coating.

In a second method we use a chemical coagulant such as is already routinely used for forming natural rubber articles by dipping. Latices of the rubber and of the thermoplastics are provided, each adapted (in a manner which may be well-known in itself) to be coagulated by a certain type of coagulant, e.g. a heavy metal salt such as calcium nitrate. As conventional, the coagulant is applied to a former e.g. by dipping the former into a solution of coagulant. The coagulant-carrying former is dipped into the rubber latex where the coagulant "breaks through" (i.e. coagulates) the latex, according to well-understood practice, to form a rubber layer on the former. The former with the fresh rubber layer is then removed from the rubber latex and dipped into the resin latex where residual coagulant which has permeated the rubber layer coagulates a thin layer of thermoplastics onto the rubber surface. The respective layer thicknesses are controllable by adjusting the dipping time.

We find that this method gives a strength of bond and resistance to delamination, presumably due to some degree of intermixing or fusion at the interface of the freshly-formed rubber layer and the coagulating thermoplastics, that cannot be achieved by ordinary sequential dipping (i.e. drying the rubber layer and applying further coagulant before dipping in the thermoplastics latex).

In a third method the latices contain an additive to render them heat-sensitive. Again, this is in itself well-known. One suitable sensitizer is BASF's "Lutenol 40", a polyvinyl methyl ether. The former is heated, dipped in the rubber latex to form the rubber layer to the predetermined thickness, withdrawn and dipped directly in the thermoplastics-containing latex where residual heat causes coagulation of the thermoplastics layer directly onto the freshly-formed rubber layer, with benefits of bonding strength as found for the second method.

It will be appreciated by a skilled reader that excess rubber latex is allowed to run off the rubber layer before dipping into the second latex.

The second and third methods offer rapid, easily-automated procedures giving good adhesion.

A further option is to use a latex which is a blend of a thermoplastics latex and a rubber (e.g. natural rubber) latex. Such a blend may be applied to form the coating by any of the means proposed herein. The rubber containing blend tends to adhere well to the rubber substrate. Proportions in the blend have been discussed above.

In an independent aspect of the invention, a rubber article (of any kind referred to herein) may consist of such a rubber/thermoplastics, rather than having such a blend applied as a coating on a rubber substrate. For example, dipped articles may be made by dipping solely into a blended latex. Any suitable rubber and thermoplastic materials, e.g. as discussed elsewhere in this description, may be used.

Embodiments of the invention are now described by way of example with reference to the accompanying drawings.

DESCRIPTION OF PREFERRED EMBODIMENTS

Figure 1:
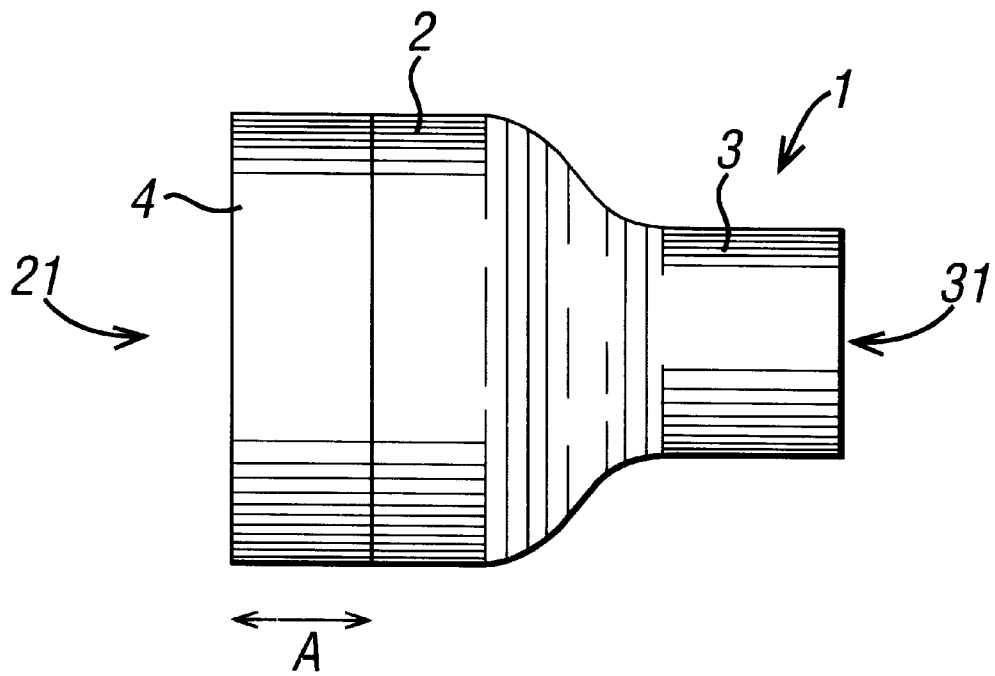
FIG. 1 is a side view of a rubber cuff seal for a drysuit.
Figure 2:
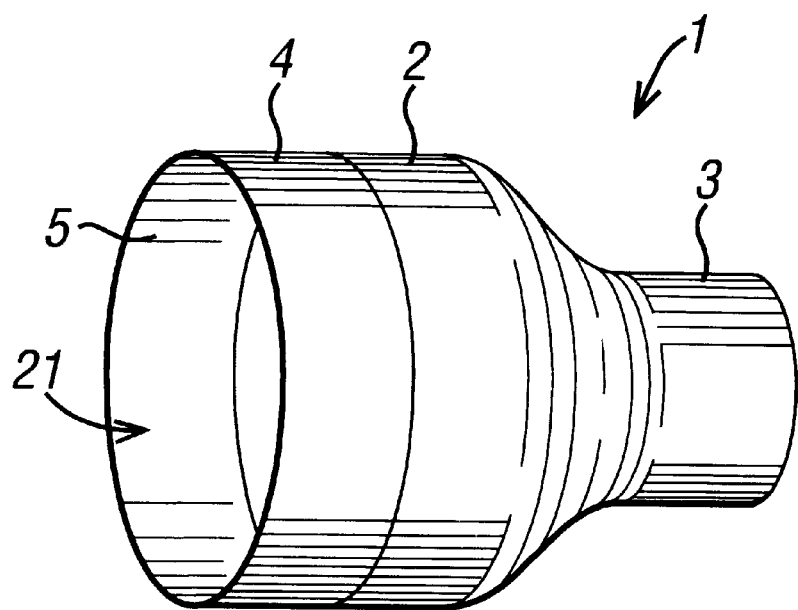
FIG. 2 is an oblique view of the FIG. 1 cuff seal.

With reference to FIGS. 1 and 2, a cuff seal 1 is a natural rubber tube conventionally made by dipping a correspondingly-shaped former (not shown) into a natural rubber latex. This seal has a small-diameter end 3 which is to fit closely around the wearer's wrist, and a large-diameter end 2 of the same size as the end of the suit sleeve to which it is to be fitted. These cuff seals are in themselves conventional. They are provided also at the neck and ankle of a conventional drysuit. Similar or analogous seals may be required in other clothing such as survival suits, oil rig abandonment suits, helicopter transport suits and chemical resistance suits.

According to our new proposals a coating of polyurethane is applied to the surface of the seal rubber. In the present embodiment the coating is applied as an outer marginal band 4 and an inner marginal band 5 next to the opening 21 of the large-diameter part of the tube 2. The width A of the band may be e.g. 25 mm.

To form the coatings 4,5, first the as-formed rubber seal is subject to a halogenation process which has been found to be important for achieving good adhesion of the subsequent polyurethane coating. This procedure also removes the surface tack of the seal, which is useful to help the user slip their hand in and out through the tight opening 31. In the present embodiment we use an aqueous bath containing nascent chlorine for the halogenation treatment. After drying, the seal 1 is then dipped to the predetermined depth in a circulating treatment bath containing an aqueous polyurethane emulsion. The precise nature of the polyurethane emulsion is not critical, provided that the resulting polyurethane coat is one which will heat-melt at the desired processing temperature. Aqueous emulsions are usually preferred because organic solvents may attack the rubber and are also environmentally difficult to handle. In this example we used Witcobond® 781, and the seal 1 was controllably dipped to the indicated depth A of 25 mm with both inner and outer surfaces exposed, to create the inner and outer bands 4, 5 of polyurethane coating which were then dried in hot air.

The exact thickness of the coating is not critical, although it is preferably a continuous coating. In general a coating of about 25 $\mu$m is usually adequate and 10 $\mu$m a likely minimum. This depends on the specific materials and is easily determined by trial. Usually the coating is not thicker than 1.5 mm, in particular not thicker than 500 μm and usually not thicker than 200 μm or 100 μm.

The seal 1 with the dried inner and outer polyurethane coatings 4,5 around its wide end is a non-tacky article that is convenient to handle.

Figure 3A:
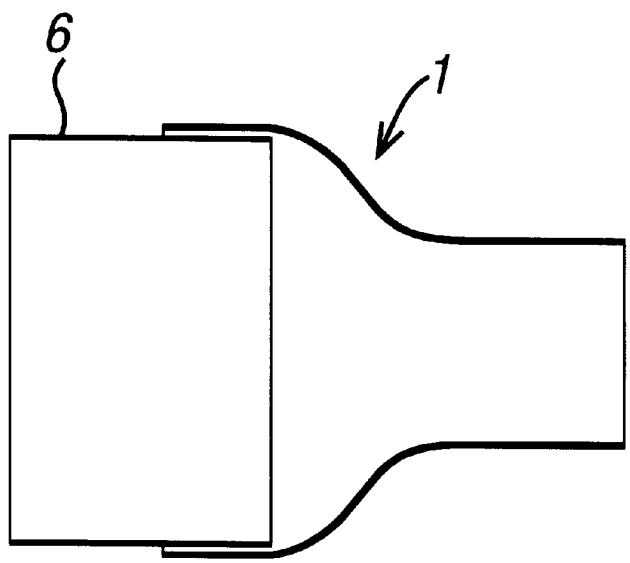
FIGS. 3($a$) and ($b$) are schematic longitudinal cross-sections showing stages of joining of the cuff seal to a suit sleeve.
Figure 3B:
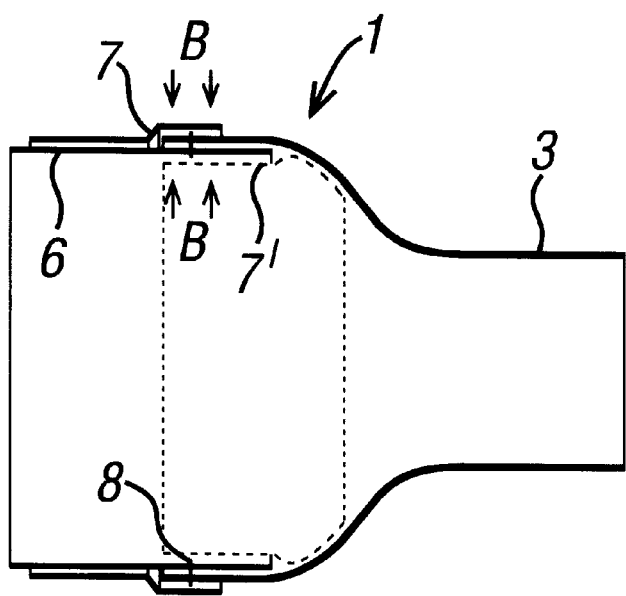

To fix it to the suit sleeve 6, the wide opening 21 of the seal 1 is fitted over the sleeve end and adjusted to the desired degree of overlap as shown in FIG. 3(a). Unlike prior art processes using adhesives, this stage is easy to control because neither surface is tacky or adherent.

If desired for strength reasons, stitching 8 may be put in around the joint. A hot-melt tape 7 is then laid around the joint, overlapping both the surface of the suit sleeve 6 and the outer polyurethane-coated band 4 of the seal 1. The hot-melt tape 7 may be a polyurethane tape. These are well-known as such, e.g. for use in closing off stitching holes between adjacent fabric panels of a drysuit, as discussed previously.

In the present proposal, however, the rubber dry seal has the polyurethane coating 4,5. When the joint region between the sleeve 6 and seal 1, overlaid with the hot-melt tape 7, is subjected to per se conventional welding procedures (e.g. pressure-rolling of preheated tape whose heat fuses the coating too, or heating by means of RF radiation) the tape fuses to the adjacent suit sleeve 6 and also to the PU-coated surface of the cuff seal margin 1. This seals the joint, provides longitudinal bonding strength, and covers stitching holes where present. Fused bonding may also occur at this stage between the inner polyurethane band 5 and the outer surface of the suit sleeve.

The skilled person will appreciate that a similar joining and sealing effect can be achieved by applying a hot-melt tape 7' on the inside of the joint. Indeed, this may be done for extra security in combination with the outside tape 7. Most users prefer an outer tape in order to cover the joint smoothly.

In an alternative embodiment the polyurethane dip coating is applied over the entire surface of the rubber seal 1. By pigmentation of the coating this can protect the underlying rubber from photo-oxidation and extend the life of the seal well beyond the normal one or two seasons. The use of pigmentation also allows for decorative colouring of the seal unit which has previously not been a practical option with natural rubber seals. It is much easier to vary the pigmentation of a coating dip than of a rubber latex.

Such an all-over coated seal also gives exactly the same benefits in hot-melt bonding as the version described above.

The skilled person will appreciate that a similar coating technique may be useful on any article, especially a rubber article, where a hot-melt or other welding application is a subsequent stage of joining or sealing to that article. Or, two coated articles of the kind described can be joined to one another by application of heat and pressure.

What is claimed is:

1. A dipped rubber seal for sealing around an opening of a water-resistant garment consisting essentially of:
   a dipped rubber membrane having a bonding surface at which it is to be bonded to secure the seal at said opening of a water-resistant garment, the bonding surface being provided by a weldable surface coating of thermoplastic polymer adhered over the underlying dipped rubber membrane.

2. A rubber seal as claimed in claim 1 which is selected from a cuff for an arm opening of said garment, a cuff for a leg opening of said garment and a collar for a neck opening of said garment.

3. A rubber seal as claimed in claim 2 in which the thermoplastic polymer of the weldable surface coating is polyurethane.

4. A rubber seal as claimed in claim 1 in which the dipped rubber membrane is of natural rubber.

5. A rubber seal as claimed in claim 1 in which said weldable surface coating is at least 10 μm thick.

6. A rubber seal according to claim 1 in which the thermoplastic polymer of the weldable surface coating is selected from ethylene polymers and copolymers, vinyl polymers and copolymers and acrylic polymers and copolymers.

7. A rubber seal as claimed in claim 1 in which the thermoplastic polymer of the weldable surface coating is blended with rubber in the coating.

8. A dipped rubber seal for a water-resistant garment such as a drysuit, being selected from a cuff for an arm opening of such a garment, a cuff for a leg opening of such a garment and a collar for a neck opening of such a garment, said seal consisting essentially of:
   a dipped rubber membrane having a bonding surface at which it is bonded to secure the seal at said opening of such garment, and the bonding surface being provided by a weldable surface coating of thermoplastic polyurethane at least 10 μm thick, adhered onto the underlying dipped rubber membrane.

9. A rubber seal as claimed in claim 8 in which the weldable surface coating covers the entire surface of the seal.

10. A rubber seal as claimed in claim 8 in which the weldable surface coating covers only a marginal region of the seal.

11. A method of making a rubber seal for sealing around an opening of a water resistant garment, comprising
   forming a rubber membrane having the desired form of the seal by dipping a former into a rubber latex, and
   dipping the formed rubber membrane in a latex containing a thermoplastic polymer, thereby forming a weldable surface coating of the thermoplastic polymer adhering over a bonding surface of the rubber membrane.

12. A method as claimed in claim 11 comprising activating the surface of the rubber membrane by halogenation before dipping it in the latex of thermoplastic polymer.

13. A method as claimed in claim 11 in which the thermoplastic polymer is polyurethane.

14. A method as claimed in claim 12 in which the thermoplastic polymer is polyurethane.

15. A method as claimed in claim 11 in which the formed rubber membrane is dipped into the thermoplastic polymer latex before the rubber membrane has dried.

16. A method as claimed in claim 11 in which said latices are coagulated by a chemical coagulant initially applied to the former, the latex of the thermoplastic polymer being coagulated to form said adherent weldable surface coating by coagulant which penetrates from the former through the rubber membrane.

17. A method as claimed in claim 11 in which said latices are heat-coagulated, the former being heated initially, and the latex of the thermoplastic polymer being coagulated to form the adhered weldable surface coating by residual heat after coagulation of the rubber membrane.

18. A method of sealingly joining a dipped rubber article at an opening of a water-resisting garment such as a drysuit, comprising
   providing said article, consisting essentially of a dipped rubber membrane having a bonding surface at least at a marginal region thereof, the bonding surface being provided by a surface coating of thermoplastic polymer adhered to the rubber membrane;

overlapping the bonding surface of the rubber article with a bordering region of the water-resistant garment around said opening;

positioning thermoplastic polymeric tape along the resulting join of the article and garment, to overlap the bonding region of the rubber article and the bordering region of the water-resistant garment, and heat-fusing the thermoplastic polymeric tape to form a welded sealed joint between the rubber article and the bordering region of the garment, with corresponding fusing of the thermoplastic polymer coating of the bonding region of the rubber article to weld it to said tape.

19. A method as claimed in claim 18 in which the thermoplastic polymer of the surface coating is polyurethane.

20. A method as claimed in claim 19 in which the thermoplastic polymeric tape is of polyurethane.

21. A method as claimed in claim 18 in which the article is selected from an arm cuff, an ankle cuff and a neck collar.

22. A method as claimed in claim 18 in which the heat-fusing of the tape is by RF treatment.

23. A method as claimed in claim 18 in which the heat-fusing of the tape includes pre-heating of the tape.

24. A method as claimed in claim 18 comprising stitching the rubber to the bordering region of the garment before positioning and heat fusing the thermoplastic tape to cover the stitching.

* * * * *